D. H. SHAPIRO.
VEHICLE TIRE.
APPLICATION FILED JUNE 22, 1916.

1,199,717.

Patented Sept. 26, 1916.

Witnesses

Inventor
D. H. Shapiro
By Fetherstonhaugh & Co
Attys

UNITED STATES PATENT OFFICE.

DAVID H. SHAPIRO, OF MONTREAL, QUEBEC, CANADA.

VEHICLE-TIRE.

1,199,717.

Specification of Letters Patent.

Patented Sept. 26, 1916.

Application filed June 22, 1916. Serial No. 105,218.

*To all whom it may concern:*

Be it known that I, DAVID H. SHAPIRO, a subject of the King of Great Britain, and resident of the city of Montreal, in the Province of Quebec and Dominion of Canada, have invented certain new and useful Improvements in Vehicle-Tires, of which the following is a full, clear, and exact description.

This invention relates to improvements in vehicle tires, and the object of the invention is to provide a non-pneumatic tire of high resiliency and great durability, which may be manufactured and sold at a minimum cost and which may be used with existing tire casings or wheels.

The device consists essentially of a casing of any usual or suitable form, a highly resilient cellular core, and means for holding the core and casing immovable with respect to one another and with respect to the wheel.

Figure 1:
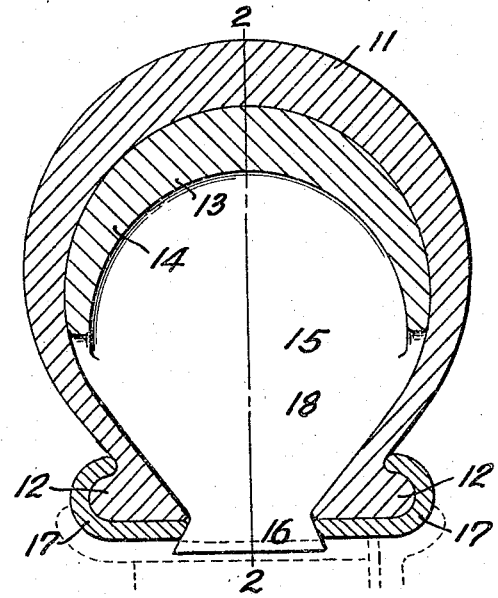
Figure 2:
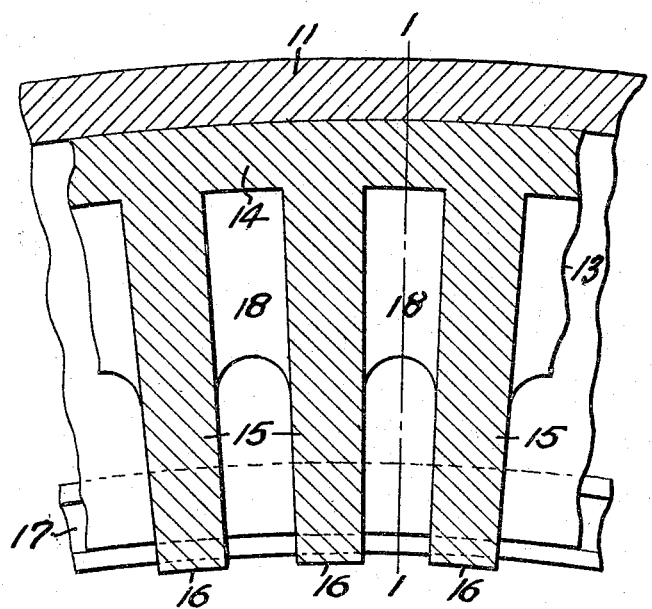

In the drawings which illustrate the invention:—Figure 1 is a cross sectional view of the tire on the line 1—1, Fig. 2. Fig. 2 is a fragmentary longitudinal section of the tire on the line 2—2, Fig. 1.

Referring more particularly to the drawings, 11 designates a casing of any usual or suitable form, having securing beads 12 at the inner edges. A filler 13 is provided in the casing of a size to completely fill the casing from the tread to the wheel felly, and from side to side of the casing. This filler is preferably in the form of an endless band made of a size suitable for the wheel to which it is to be applied, but it will be understood that the material may be made of any length and cut as required, and the ends joined to make an endless band which will fit the required wheel. All parts of the filler are integral and consist of an outer tread portion 14 substantially semi-circular and crescent-shaped, as shown in Fig. 1, and a plurality of columns or plates 15, which extend from the tread portion 14 slightly beyond the edges of the casing, so as to engage the rim of the wheel. These columns also extend from side to side of the casing, and are formed to fit snugly therein. The portion of the columns projecting beyond the inner periphery of the casing increases in width, as shown at 16, so as to present inclined surfaces to the demountable rim parts 17, which engage the beads of the casing in the usual manner. The columns are of a thickness suited to the size of the tire, and the load to which it will be subjected, and are uniformly spaced apart according to the same considerations to form cells 18. These columns, which are radially disposed, are designed to be gripped by the demountable rim parts 17 so as to prevent any movement thereof, such as would be caused by creeping of the filler which would throw the columns out of their true radial position and subject them to bending stresses. The free ends of the columns may project slightly beyond the demountable rim parts 17, so that when the tire is placed on a wheel, the columns will be under slight initial compression which will be increased when the demountable rim parts are securely clamped to the wheel rim. The material used in making the filler is preferably live rubber of high resiliency, but may be of any other material found suitable for the purpose. Where rubber is used, it is essential that the composition of the rubber be of a non-heating character, so that the molecular friction and heat absorbed from the road will have the minimum of destructive effect on the mass.

It will be seen that the outer portion of the filler engages the entire surface of the casing in line with and adjacent the tread, and that the outer portion of the filler is supported at sufficiently close intervals to insure a uniform support for the entire tread surface of the casing, in order that the wear of the casing may be uniform. The crescent-shaped cross section of the filler portion 14 is preferably designed to form a perfect spring, in order that when pressure is applied at the tread surface, it is distributed throughout the portion 14. This lateral expansion of the portion 14 under pressure is resisted by the columns 15, which being integral with the portion 14 constitute tension members connecting the horns of the crescent-shaped section at short intervals, while at the same time the columns are in compression directly between the tread of the casing and the wheel rim, so that the edges of the casing do not transmit any of this pressure and the possibility of the tire creeping on the wheel is completely removed. As will be clearly seen in Fig. 2, the portion 14 comes down on the sides, so that in addition to being supported by the columns, it supports the columns in the circumferential direction of the wheel and tends to maintain them against displacement.

In applying the tire, a plentiful supply of ground mica or powdered soapstone is inserted, according to the usual custom, between the casing and the filler to reduce any friction which may occur between these relatively movable parts.

If it is found desirable, the tread surface of the filler may be reinforced with fabric and any other parts of the structure may be similarly reinforced in such a manner as will not interfere with the resiliency of the filler.

Having thus described my invention, what I claim is:—

1. In a tire, the combination with a casing, of a cellular filler therefor having an integral part thereof projecting beyond the inner edges of the casing, the edges of the casing and the projecting portion of the filler adapted to be simultaneously engaged by the demountable rim members of the wheel to which the tire is applied, said projection passing between the rim members and adapted to be clamped thereby.

2. In a tire, a casing, a separate filler having a tread portion approximately crescent-shaped in cross section, and integral radially disposed columns extending from side to side of the casing and projecting beyond the edges thereof.

3. In a tire, a casing, a filler therein separate from the casing, comprising a tread portion arcuate in cross section, and integral columns in compression radially to support the tread and in tension transversely between the edges of the tread portion, said columns being formed for attachment to a wheel rim independently of the casing.

4. In a tire, a casing adapted for attachment at its edges to a wheel rim by demountable rim members, a filler therein comprising a continuous tread portion, and integral columns adapted to support the same directly from the rim of a wheel, and enlarged end portions on said columns projecting beyond the casing edges adapted for attachment to a wheel rim independently of the casing by the casing attaching means.

In witness whereof, I have hereunto set my hand, in the presence of two witnesses.

DAVID H. SHAPIRO.

Witnesses:
S. R. W. ALLEN,
G. M. MORELAND.

Copies of this patent may be obtained for five cents each, by addressing the "Commissioner of Patents, Washington, D. C."